Aug. 25, 1964

A. W. PRATT 3,146,358

ABNORMAL VOLTAGE DETECTION CIRCUITS

Filed July 3, 1962

INVENTOR
Aloysius W. Pratt

BY *Stewart F. Moore*

ATTORNEY

United States Patent Office 3,146,358
Patented Aug. 25, 1964

3,146,358
ABNORMAL VOLTAGE DETECTION CIRCUITS
Aloysius W. Pratt, New Carlisle, Ohio, assignor to American Machine & Foundry Company, a corporation of New Jersey
Filed July 3, 1962, Ser. No. 207,228
11 Claims. (Cl. 307—88.5)

This invention relates to circuits for sensing a voltage abnormality and supplying a control signal thereupon, and having an inverse time-voltage characteristic.

By the term "voltage abnormality" is meant either a voltage which is greater than a predetermined maximum reference level, or overvoltage; or a voltage which is lower than a predetermined minimum reference level, or undervoltage.

It is often desirable to incorporate an inverse time-voltage characteristic into devices for the protection of circuit components from the damaging effect of abnormal voltages, so that the time which elapses between the first occurrence of the voltage abnormality and the tripping or actuating of a circuit control device such as a circuit breaker, varies inversely with the amplitude of the voltage abnormality. In the case of only a slight overvoltage or undervoltage, which would not immediately damage circuit components, it is desirable to wait a relatively long period of time before actuating a circuit breaker or the like, in order that circuit operation not be interrupted if the abnormality should correct itself within a reasonable time. On the other hand, a voltage abnormality of larger amplitude would require faster actuation of a circuit breaker, since the effect of the abnormality would be more immediately damaging.

It is an object of this invention to provide a circuit for the detection of abnormal voltages which has an inverse time-voltage characteristic.

It is a further object of this invention to provide such a circuit having few components, and which is simple in operation and economical to construct.

It is another object of this invention to provide such a circuit in which the inverse time-voltage characteristic is precisely defined, so that the relationship between the amplitude of the voltage abnormality and the time required to actuate a circuit control device may be precisely known and accurately controlled.

It is still another object of this invention to provide such a circuit which may be easily adapted to either an overvoltage or an undervoltage detection circuit.

It is yet another object of this invention to provide such a detection circuit in which the relationship between the amplitude of the voltage abnormality and the actuation time may be easily adjusted.

The objectives are accomplished in this invention broadly by means of two voltage comparison circuits and a voltage-varying circuit. The input voltage, that is, the voltage whose amplitude is being monitored, is compared with a predetermined standard in the first voltage comparison circuit. If this first comparison indicates an abnormality, the voltage-varying circuit is actuated and supplies to the second comparison circuit a voltage which approaches the predetermined standard voltage as a time function. This varying voltage is compared with the input voltage in the second comparison circuit. When they reach a predetermined relationship, the second voltage comparison means supplies an output signal to a load device or circuit control device. If, on the other hand, the input voltage returns to normal before reaching the predetermined relationship with the varying voltage, there is no signal from the second voltage comparison circuit and the load device or circuit control device is not actuated.

The invention may be more fully understood by reference to the following detailed description taken in conjunction with the drawings, which form a part of this specification, and in which.

Figure 1:
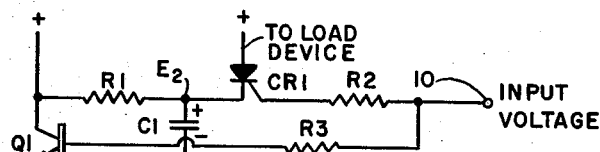
FIG. 1 is a partial schematic, showing only the most important circuit elements, of the invention embodied in an overvoltage detection device.

In the partial schematic diagram of FIG. 1, an NPN transistor Q1 is shown, with its emitter maintained at a reference voltage $E_1$ and its collector at some more positive potential, thus supplying the transistor with the necessary operating potential. A capacitor C1 has one plate connected directly to the emitter of transistor Q1 and the other plate connected to the collector through resistor R1. The junction of capacitor C1 and resistor R1 is maintained at a potential $E_2$ more positive than potential $E_1$. Capacitor C1 therefore is charged to a potential difference $E_2-E_1$. A controlled rectifier CR1 has its cathode connected to the junction of capacitor C1 and resistor R1, and its anode connected to some potential more positive than $E_2$. The anode of controlled rectifier CR1 is also connected to a load device and the rectifier will actuate the load device, which may be for instance a circuit breaker, when it conducts. The input voltage, which is the voltage to be monitored by the detection circuit, appears at terminal 10 and is applied to the control electrode of rectifier CR1 through resistor R2 and to the base of transistor Q1 through resistor R3. The additional circuitry required to supply the appropriate potentials and to operate the transistor and the controlled rectifier is not shown in this partial schematic so that the description of the circuit may be simplified by restricting it to only the essential circuit elements.

Since this is an overvoltage detection circuit, reference voltage $E_1$ represents the desired upper limit of the normal voltage operating range of the input voltage appearing at terminal 10. Under normal circuit operating conditions then, the voltage appearing at terminal 10 and applied to the base of transistor Q1 through resistor R3, will be more negative than reference voltage $E_1$ appearing on the emitter of transistor Q1, and transistor Q1 will not conduct. The input voltage is also fed to the control element of controlled rectifier CR1 through resistor R2, and since under normal conditions, it will be more negative than voltage $E_2$ appearing on the cathode of rectifier CR1, this rectifier will also be nonconductive. Therefore, while the circuit being monitored is operating normally, both the transistor and the rectifier will be nonconductive and capacitor C1 will remain charged to a voltage $E_2-E_1$.

Figure 4:
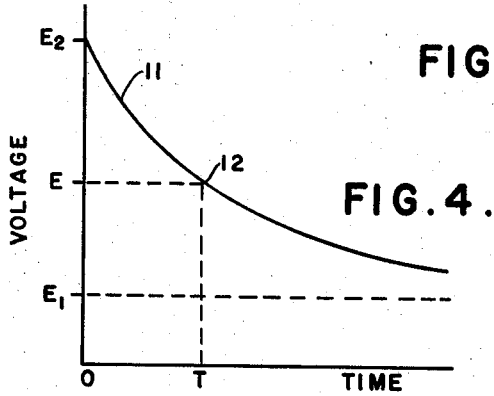
FIG. 4 is a curve illustrating the inverse time-voltage characteristic of the circuit of FIGS. 1 and 3.

When the input voltage rises to some voltage E greater than reference voltage $E_1$, but less than voltage $E_2$, the emitter-base diode of transistor Q1 will become forward biased and transistor Q1 will conduct. Capacitor C1 will then commence to discharge through resistor R1 and transistor Q1, and the potential on the upper plate of capacitor C1, and hence on the cathode of controlled rectifier CR1, will decrease exponentially from the value $E_2$ and approach the value $E_1$, as shown by curve 11 of FIG. 4. If the input voltage remains at a value E, the exponentially decreasing voltage on the cathode of rectifier CR1 will become equal to the input voltage at some time T. This is shown in FIG. 4 by the intersection 12 of the horizontal dotted line representing the voltage E with the exponential voltage curve 11. When these two voltages become equal, controlled rectifier CR1 will conduct, supplying an actuating signal to the load device, which may be, for instance, the solenoid of a relay designed to open the circuit. Actually, the voltage on the cathode of CR1 must become slightly more negative than the voltage on the control electrode for conduction to take place. This fraction of a volt difference has not been shown in FIG. 4 in the interest of simplicity.

From an examination of the curve of FIG. 4, it is obvious that the more positive the input voltage E, the less time T will elapse before actuation of the load device, thus providing the desired inverse time-voltage circuit characteristic. This time delay has the obvious advantage of permitting any slight overvoltage to clear itself and the circuit to return to normal, before the load device is actuated. Thus, in FIG. 4, if input voltage E returned to a value more negative than reference voltage $E_1$ prior to time T, the voltages on the cathode and control electrode of rectifier CR1 would not become equal and the rectifier would not conduct. As soon as the input voltage drops back down below the reference voltage $E_1$, transistor Q1 will again be cut off and remove the discharge path for capacitor C1. The capacitor will then recharge to a voltage $E_2 - E_1$ and the detection circuit will resume its normal condition. If the input voltage should rise suddenly so high that it is more positive than voltage $E_2$, then the load device would of course be actuated immediately.

The accuracy of this circuit, and the ease with which circuit parameters may be altered to obtain the precise operating characteristics desired, is apparent. Reference voltage $E_1$ may be conveniently set to provide any desired upper limit to the circuit operating potential. Potential $E_2$ may be set to permit delayed load device actuation for overvoltages of a magnitude which would not immediately be harmful to circuit components and to effect immediate operation of the load device for potentials in excess of $E_2$ which would be damaging if they were allowed to continue for even a short period of time. The values of R1 and C1 of course may be adjusted to give an RC time constant in the discharge circuit which will provide any desired degree of delay. Once these operating parameters are determined, the time-voltage discharge path 11 of the cathode of rectifier CR1 will be accurately known and the time delay corresponding to any particular overvoltage may be precisely predicted.

It will be seen that basically the circuit of FIGURE 1 comprises two comparison circuits, one across the emitter-base diode of transistor Q1 and the other between the control electrode and the cathode of controlled rectifier CR1, and a voltage-varying circuit comprising capacitor C1 and its discharge path through resistor R1 and transistor Q1. The input voltage is compared with reference voltage $E_1$ in the first comparison circuit; and the result of this comparison is used to initiate the voltage-varying operation. The varying voltage is compared with the input voltage in the second comparison circuit and the result used to actuate the load device.

Figure 2:
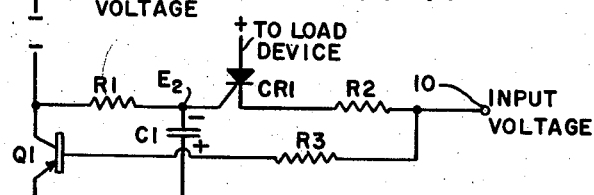
FIG. 2 is a partial schematic, showing only the most important elements, of the invention embodied in an undervoltage detecting device.

The partial schematic diagram of FIG. 2 shows the basic elements of a circuit similar to that shown in FIG. 1, but altered slightly to provide an undervoltage detection circuit rather than an overvoltage detection circuit as in FIG. 1. The circuit elements in FIG. 2 having positions and functions analogous to those of FIG. 1 are given similar designations. In FIG. 2, transistor Q1 is PNP transistor rather than an NPN as in FIG. 1. Controlled rectifier CR1 has its control electrode (rather than its cathode, as in FIG. 1) connected to the junction of capacitor C1 and resistor R1, and has its cathode connected through resistor R2 to the input voltage appearing at terminal 10. The anode of CR1 is maintained at a potential which is positive with respect to $E_2$. The operating potential applied across the emitter and collector of transistor Q1 is of course reversed from that required for the NPN transistor of FIG. 1, and $E_1$ in the circuit of FIG. 2 represents the desired lower limit of the operating voltage range of the input voltage. The other circuit components and their connections are identical to those shown in FIG. 1.

The circuit of FIG. 2 is adapted to detect any dropping of the input voltage to a potential which is more negative than reference voltage $E_1$. Under normal conditions the input voltage applied to the base of Q1 will be more positive than reference voltage $E_1$, the emitter-base diode of transistor Q1 will be back biased and the transistor will not conduct. The input voltage will also be more positive than voltage $E_2$ on the control element of rectifier CR1. Therefore the cathode of rectifier CR1 will be more positive than the control element and the rectifier will not conduct. The operation of the circuit is analogous to the operation of the circuit of FIG. 1, but with the voltage polarities reversed. Thus, if the input voltage falls below reference voltage value $E_1$ but not below voltage $E_2$, the emitter-base diode of transistor Q1 will become biased to saturation and Q1 will conduct, permitting capacitor C1 to discharge through resistor R1 and the transistor Q1. As the capacitor discharges, the voltage on the upper plate will approach reference voltage $E_1$ exponentially. When it becomes a fraction of a volt greater than the input voltage, control rectifier CR1 will conduct and provide a signal for actuation of the load device.

Figure 3:
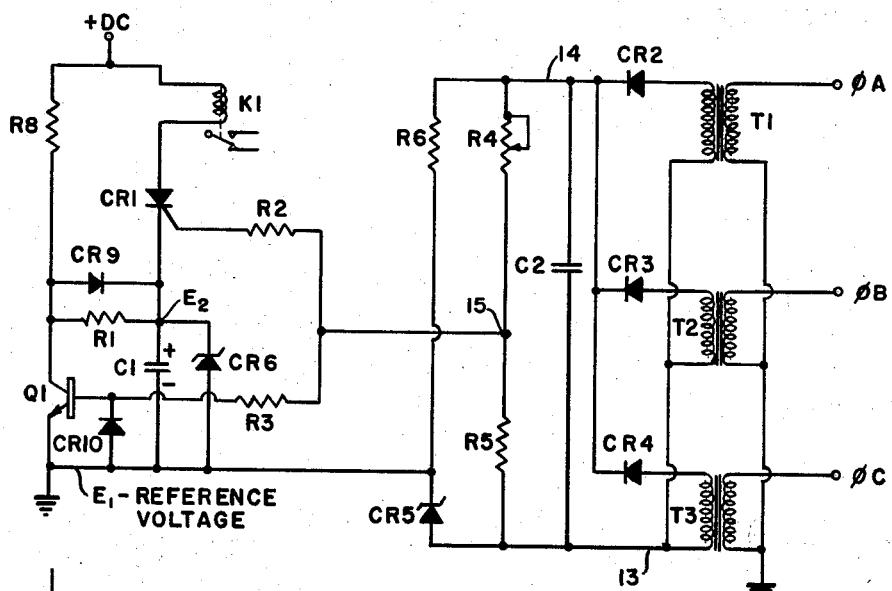
FIG. 3 is a schematic diagram showing the embodiment of FIG. 1 as a part of an overvoltage protection device for a three phase alternating current circuit.

The schematic diagram of FIG. 3 shows the circuit of FIG. 1 embodied in an overvoltage detection circuit for a three phase alternating current circuit. The primary windings of transformers T1, T2 and T3 are connected from phase A, phase B and phase C, respectively, of the circuit to be monitored to ground. The secondary windings are connected at one end to bus 13, and at the other end to the anodes of the rectifiers CR2, CR3 and CR4, respectively. The cathodes of the three rectifiers are connected together and to bus 14. Filter capacitor C2 is connected between buses 13 and 14. The voltage appearing across the secondary winding of each transformer will then be proportional to the voltage between its corresponding phase and ground, with the exact proportion depending upon the transformer turns ratio. The three secondary windings are parallel connected across buses 13 and 14, and the selective action of the rectifiers CR2, CR3 and CR4, with their cathodes tied together, results in a voltage between buses 13 and 14 representing the highest peak voltage existing on any of the three phases. Adjustable resistor R4 and fixed resistor R5 are connected in series across buses 13 and 14. This series connected circuit forms a voltage divider, and the voltage appearing at the junction 15 of resistors R4 and R5 is the voltage which is applied to the comparison circuit.

The anode of Zener diode CR5 is connected to bus 13 and its cathode is connected to one side of resistor R6, the other side of resistor R6 being connected to bus 14. The cathode of Zener diode CR5 is also connected to ground, which is reference voltage $E_1$ in this circuit. Resistor R6 and Zener diode CR5 thus form a voltage divider connected across buses 13 and 14, and the constant voltage drop appearing across diode CR5 sets the level of the voltage appearing on bus 13 with respect to reference voltage $E_1$ (ground).

The comparison circuitry shown in the left hand portion of FIG. 3, while containing some additional components whose function will be described below, comprises basically the arrangement of components shown in the partial schematic of FIG. 1. The emitter of NPN transistor Q1 is connected to ground, which is also the reference voltage $E_1$, and the collector is connected through resistor R8 to the positive D.C. voltage supply. The base of transistor Q1 is connected to junction point 15 through resistor R3. The anode of controlled rectifier CR1 is connected through the coil of relay K1 to the positive D.C. voltage supply. The cathode of rectifier CR1 is connected to the junction point of resistor R1 and capacitor C1. The control element of rectifier CR1 is connected through resistor R2 to junction point 15. Diode CR9 is connected in parallel with resistor R1, having its anode connected to the collector of transistor Q1 and its cathode connected to the junction point of resistor R1 and capacitor C1. Zener diode CR6 is connected across capacitor C1, its cathode being connected to the junction of capacitor C1 and resistor R1 and its anode to ground. Diode CR10 is connected across the emitter-base circuit of transistor Q1, its cathode connected to the base and its anode to the emitter, which is at ground.

Capacitor C1 is initially charged by means of the divider network comprising the series combination of resistor R8, diode CR9 and Zener diode CR6 which form a voltage divider network extending between the positive D.C. supply and ground. The Zener voltage of diode CR6 determines the charge on capacitor C1; it is equal to $E_2-E_1$, and therefore capacitor C1 will be initially charged so that its upper plate is at the potential $E_2$ and its lower plate at potential $E_1$ (ground). Diode CR10 protects the emitter-base circuit of transistor Q1 from any high inverse voltages resulting when the voltage at junction point 15 is considerably lower than reference voltage $E_1$.

The operation of the overvoltage protection circuitry, comprising the lefthand portion of the schematic of FIG. 3, is similar to the operation of the circuit of FIG. 1, which has already been described. The D.C. voltage appearing at junction point 15 is analogous to the input voltage appearing at terminal 10 of FIG. 1. The voltage at junction point 15, as has already been described above, is proportional to the highest peak voltage on any of the three phases of the three phase alternating current supply being monitored, with the constant of proportionality being determined by the turns ratios of transformers T1, T2 and T3 and by the parameters of the resistive voltage divider network comprising fixed resistor R5 and adjustable resistor R4. This voltage is coupled to the base of transistor Q1 through resistor R3, and is compared with the reference voltage $E_1$ appearing on the transistor emitter. If it exceeds the voltage on the emitter, transistor Q1 will conduct, commencing discharge of capacitor C1, which had initially been charged to a potential difference of $E_2-E_1$, along voltage-time curve 11 of FIG. 4, in the manner previously described. The potential appearing on the upper plate of capacitor C1 is applied to the cathode of control rectifier CR1, and the voltage appearing at junction point 15 is applied through resistor R2 to the control element of the controlled rectifier. When the decreasing voltage on the rectifier cathode becomes less than the voltage on the control element, rectifier CR1 will conduct and actuate relay K1, which is the load device in this embodiment. Should the circuit voltages return to normal before load device K1 is triggered, transistor Q1 will be turned off, and capacitor C1, which can no longer discharge through the transistor, will recharge to its original value $E_2-E_1$.

It is obvious that various changes and modifications to the circuitry described above may be made by those skilled in the art without departing from the scope of the invention, which is defined solely in the claims.

What is claimed is:

1. A system for actuating a control device in response to an abnormal input voltage comprising:
    first comparison means, said means adapted to compare the input voltage with a reference voltage and to provide an output signal when their difference exceeds a predetermined value;
    voltage-varying means
        connected to said first comparison means,
        having an output normally maintained at a fixed voltage with respect to said reference voltage,
        and adapted to decrease the voltage difference between said output and said reference voltage as a function of time during the existence of an output signal from said first comparison means; and
    second comparison means
        connected to said output of said voltage-varying means and adapted to compare the voltage thereon with said input voltage, and
        adapted to supply an actuating signal when the difference between the voltage on said output of said voltage-varying means and said input voltage exceeds a predetermined value.

2. The system of claim 1 in which
    said first comparison means comprises switching means
        having two elements,
        having two operative states,
        and adapted to be switched from one operative state to the other when the voltage difference between said elements exceeds a predetermined value;
    said reference voltage is applied to one of said elements; and
    said input voltage is applied to the other of said elements.

3. The system of claim 2 in which
    said switching means comprises a transistor having two input elements;
    said reference voltage is applied to one of said input elements;
    said input voltage is applied to the other of said input elements; and
    said output signal comprises conduction of said transistor.

4. The system of claim 3 in which
    said reference voltage is applied to the emitter of said transistor; and
    said input voltage is applied to the base of said transistor.

5. The system of claim 1 in which said voltage-varying means comprises:
    a capacitor,
        one plate of which is maintained at said reference voltage,
        the other plate of which comprises said output of said voltage-varying means and is normally maintained at a fixed voltage difference with respect to said reference voltage;
    an impedance located in the discharge path of said capacitor;
    with the decrease in said voltage difference between said output and said reference voltage being effected by the discharge of said capacitor through said impedance.

6. The system of claim 5 in which
    said first comparison means comprises switching means in series with the discharge path of said capacitor, and
    said switching means permits discharge of said capacitor when the difference between said input voltage and said reference voltage exceeds a predetermined value.

7. The system of claim 6 in which
    said switching means comprises a transistor having its output circuit connected in series with the discharge path of said capacitor, and
    said reference voltage and said input voltage are connected to the input circuit of said transistor.

8. The system of claim 1 in which:
    said second comparison means comprises switching means
        having two elements, and
        being rendered conductive when the voltage between said elements exceeds a fixed value;
    said output voltage of said voltage-varying means is applied to one of said elements;
    said input voltage is applied to the other of said elements; and said actuating signal comprises conduction of said switching means.

9. The system of claim 8 in which
said switching means comprises a controlled rectifier, and
said elements comprise the cathode and control electrode of said rectifier.

10. A circuit for actuating a control device in response to an abnormal voltage in a polyphase alternating current system, comprising:
means for obtaining a control voltage which is a function of the largest peak voltage of any phase of said system;
first comparison means, said means adapted to compare said control voltage with a reference voltage and to provide an output signal when their difference exceeds a predetermined value;
voltage-varying means
connected to said first comparison means,
having an output normally maintained at a fixed voltage with respect to said reference voltage,
and adapted to decrease the voltage difference between said output and said reference voltage as a function of time during the existence of an output signal from said first comparison means; and
second comparison means
connected to said output of said voltage-varying means and adapted to compare the voltage thereon with said control voltage, and
adapted to supply an actuating signal when the difference between the voltage on said output of said voltage-varying means and said control voltage exceeds a predetermined value.

11. The circuit of claim 10 in which said means for obtaining a control voltage comprises:
a rectifier corresponding to each phase of said system, each said rectifier having an input and an output;
the input of each said rectifier connected to the corresponding phase of said system;
the outputs of all said rectifiers connected at a common point;
whereby the control voltage appearing at said common point will be a function of the largest peak voltage of any phase of said system.

No references cited.